(12) United States Patent
Li et al.

(10) Patent No.: US 12,517,901 B1
(45) Date of Patent: Jan. 6, 2026

(54) SYSTEM AND METHOD FOR QUERY INTERFACE RESPONSE SYNTHESIS VIA MACHINE LEARNING AND PROGRESSIVE QUERY DATA DECOMPOSITION

(71) Applicant: BANK OF AMERICA CORPORATION, Charlotte, NC (US)

(72) Inventors: Yvonne Li, Jersey City, NJ (US); Sushant Hanmant Gosavi, Jacksonville, FL (US); Debra A. Holder, Solebury, PA (US); Juned Gulabkhan Inamdar, Maharashtra (IN); Min Kyung Kim, New York, NY (US); Makesh Krishnan, Tamil Nadu (IN); Nizar Naitlho, Jersey City, NJ (US); Megan Lynn Mcguire, Harleysville, PA (US); Zhexiao Zhang, Jersey City, NJ (US)

(73) Assignee: BANK OF AMERICA CORPORATION, Charlotte, NC (US)

(*) Notice: Subject to any disclaimer, the term of this patent is extended or adjusted under 35 U.S.C. 154(b) by 0 days.

(21) Appl. No.: 18/937,310

(22) Filed: Nov. 5, 2024

(51) Int. Cl.
*G06F 16/24* (2019.01)
*G06F 16/2453* (2019.01)
*G06F 16/9032* (2019.01)
*G06F 16/93* (2019.01)
*G06N 3/0475* (2023.01)

(52) U.S. Cl.
CPC .. *G06F 16/24535* (2019.01); *G06F 16/24542* (2019.01); *G06F 16/90332* (2019.01); *G06F 16/93* (2019.01); *G06N 3/0475* (2023.01)

(58) Field of Classification Search
CPC ........ G06F 16/24535; G06F 16/24542; G06F 16/92
See application file for complete search history.

(56) References Cited

U.S. PATENT DOCUMENTS

| | | |
|---|---|---|
| 7,194,461 B2 | 3/2007 | Kawatani |
| 8,346,792 B1 | 1/2013 | Baker et al. |
| 10,459,989 B1 | 10/2019 | Haahr et al. |
| 10,963,497 B1 | 3/2021 | Tablan et al. |
| 11,250,039 B1 | 2/2022 | Chang et al. |
| 11,461,376 B2 | 10/2022 | Liu et al. |
| 11,630,833 B2 | 4/2023 | Kesarwani et al. |

(Continued)

*Primary Examiner* — Loc Tran
(74) *Attorney, Agent, or Firm* — Moore & Van Allen PLLC; Andrew T. Wood

(57) ABSTRACT

Systems, computer program products, and methods are described herein for query interface response synthesis via machine learning and progressive query data decomposition. The present disclosure includes receiving a document, parsing retrievable text in the document to identify a query in the retrievable text, decomposing the query, using a generative AI model comprising a large language model, into a sub-query sequence, wherein the sub-query sequence comprises a plurality of sub-queries, the plurality of sub-queries within the sub-query sequence successively increasing in complexity, retrieving, using a retriever, data records corresponding with a user identifier, transmitting the data records to the generative AI model, generating, within a first persistent dialogue session of the generative AI model, successive responses according to the sub-query sequence, and collating the successive responses into collated response data.

17 Claims, 8 Drawing Sheets

(56) References Cited

U.S. PATENT DOCUMENTS

| | | |
|---|---|---|
| 11,971,914 B1 | 4/2024 | Watson et al. |
| 12,013,885 B2 | 6/2024 | Faruqui et al. |
| 12,124,439 B2 | 10/2024 | Zhao et al. |
| 2020/0327133 A1 | 10/2020 | Ali et al. |
| 2020/0387672 A1 | 12/2020 | Loghmani |
| 2021/0271697 A1 | 9/2021 | Agrawal et al. |
| 2023/0161801 A1 | 5/2023 | Hammontree et al. |
| 2024/0320475 A1 | 9/2024 | West et al. |
| 2024/0370769 A1* | 11/2024 | Sheth .................. G06N 20/00 |
| 2025/0148220 A1* | 5/2025 | Nori .................... G06F 40/40 |

* cited by examiner

SYSTEM AND METHOD FOR QUERY INTERFACE RESPONSE SYNTHESIS VIA MACHINE LEARNING AND PROGRESSIVE QUERY DATA DECOMPOSITION

TECHNOLOGICAL FIELD

Example implementations of the present disclosure relate to a system and method for query interface response synthesis via machine learning and progressive query data decomposition.

BACKGROUND

Currently, users may be required to complete comprehensive questionnaires pertaining to interactions with third parties. These questionnaires are essential for tracking client-specific circumstances, such as changes in financial status, personal goals, or other relevant factors that might influence advice being provided. Additionally, they serve as a formal record to document the guidance given based on those circumstances. Accurate and thorough completion of these questionnaires is critical to ensuring that advice remains relevant and tailored to each client's evolving needs. This process is not only vital for maintaining a consistent service standard but also for ensuring regulatory compliance in industries that demand precise documentation of client interactions. However, unwanted variation in the completeness and accuracy of the responses in the questionnaires creates uncertainty and sews doubt in any subsequent processes that rely on these responses. Thus, there is a substantial need for a system and method for query interface response synthesis via machine learning and progressive query data decomposition.

BRIEF SUMMARY

Systems, methods, and computer program products are provided for query interface response synthesis via machine learning and progressive query data decomposition.

In one aspect, a system for query interface response synthesis via machine learning and progressive query data decomposition is presented. The system may include a processing device, and a non-transitory storage device containing instructions, when executed by the processing device, the instructions cause the processing device to perform the steps of receiving a document, parsing retrievable text in the document to identify a query in the retrievable text, decomposing the query, using a generative AI model having a large language model, into a sub-query sequence, wherein the sub-query sequence may include a plurality of sub-queries, the plurality of sub-queries within the sub-query sequence successively increasing in complexity, retrieving, using a retriever, data records corresponding with a user identifier, transmitting the data records to the generative AI model, generating, within a first persistent dialogue session of the generative AI model, successive responses according to the sub-query sequence, and collating the successive responses into collated response data.

In some implementations, the document may include inaccessible text embedded in the document, and the instructions may further cause the processing device to perform the steps of processing the document, using optical character recognition, to transform the inaccessible text into the retrievable text.

In some implementations, the instructions further cause the processing device to perform the steps of receiving, from a historical records repository, a historical query and a historical response corresponding to the historical query, applying a ground truth label to the historical response, transmitting the historical query to the generative AI model, decomposing, by using the generative AI model, the historical query into a training sub-query sequence in each of a first set of a predetermined number of distinct persistent dialogue sessions, wherein each training sub-query sequence may include a respective plurality of training sub-queries successively increasing in complexity, generating, by a second set of a predetermined number of distinct persistent dialogue sessions, wherein each of the second set of a predetermined number of distinct persistent dialogue sessions is provided with a corresponding training sub-query sequence, successive training responses according to the respective training sub-query sequence, determining a singular integrated training response for each of the successive training responses, each singular integrated training response being selected from the group consisting of (i) a final training response of the respective successive training response, and (ii) an aggregated training response having the respective successive training response aggregated by the generative AI model, determining a preferred generated training response and a corresponding preferred training sub-query sequence, the preferred generated training response being the singular integrated training response most similar to the historical response, and training the generative AI model to prioritize the preferred training sub-query sequence that output the preferred generated training response.

In some implementations, decomposing the historical query into a training sub-query sequence in each of the first set of the predetermined number of distinct persistent dialogue sessions is based on non-greedy decoding of at least one selected from the group consisting of top-k, top-p, and beam search.

In some implementations, the collated response data may include a data object having a key-value pair for each response of the successive responses.

In some implementations, the collated response data may further include a report having a predefined template for receiving the key-value pair for each response of the successive responses.

In some implementations, collating the successive responses into the collated response data may include determining a singular integrated response from the successive responses, the singular integrated response being selected from the group consisting of (i) a final response of the successive responses, and (ii) an aggregated response having the successive responses aggregated by the generative AI model.

In another aspect, a computer program product for query interface response synthesis via machine learning and progressive query data decomposition is presented. The computer program product having a non-transitory computer-readable medium having code causing an apparatus to receive a document, parse retrievable text in the document to identify a query in the retrievable text, decompose the query, using a generative AI model having a large language model, into a sub-query sequence, wherein the sub-query sequence may include a plurality of sub-queries, the plurality of sub-queries within the sub-query sequence successively increasing in complexity, retrieve, using a retriever, data records corresponding with a user identifier, transmit the data records to the generative AI model, generate, within a first persistent dialogue session of the generative AI model, successive responses according to the sub-query sequence, and collate the successive responses into collated response data.

In some implementations, the document may include inaccessible text embedded in the document, and the code may further cause the apparatus to process the document, using optical character recognition, to transform the inaccessible text into the retrievable text.

In some implementations, the code further causes the apparatus to receive, from a historical records repository, a historical query and a historical response corresponding to the historical query, apply a ground truth label to the historical response, transmit the historical query to the generative AI model, decompose, by using the generative AI model, the historical query into a training sub-query sequence in each of a first set of a predetermined number of distinct persistent dialogue sessions, wherein each training sub-query sequence may include a respective plurality of training sub-queries successively increasing in complexity, generate, by a second set of a predetermined number of distinct persistent dialogue sessions, wherein each of the second set of a predetermined number of distinct persistent dialogue sessions is provided with a corresponding training sub-query sequence, successive training responses according to the respective training sub-query sequence, determine a singular integrated training response for each of the successive training responses, each singular integrated training response being selected from the group consisting of (i) a final training response of the respective successive training response, and (ii) an aggregated training response having the respective successive training response aggregated by the generative AI model, determine a preferred generated training response and a corresponding preferred training sub-query sequence, the preferred generated training response being the singular integrated training response most similar to the historical response, and train the generative AI model to prioritize the preferred training sub-query sequence that output the preferred generated training response.

In some implementations, decomposing the historical query into a training sub-query sequence in each of the first set of the predetermined number of distinct persistent dialogue sessions is based on non-greedy decoding of at least one selected from the group consisting of top-k, top-p, and beam search.

In some implementations, the collated response data may include a data object having a key-value pair for each response of the successive responses.

In some implementations, the collated response data may further include a report having a predefined template for receiving the key-value pair for each response of the successive responses.

In some implementations, collating the successive responses into the collated response data may include determining a singular integrated response from the successive responses, the singular integrated response being selected from the group consisting of (i) a final response of the successive responses, and (ii) an aggregated response having the successive responses aggregated by the generative AI model.

In yet another aspect, a method for query interface response synthesis via machine learning and progressive query data decomposition is presented. The method may include receiving a document, parsing retrievable text in the document to identify a query in the retrievable text, decomposing the query, using a generative AI model having a large language model, into a sub-query sequence, wherein the sub-query sequence may include a plurality of sub-queries, the plurality of sub-queries within the sub-query sequence successively increasing in complexity, retrieving, using a retriever, data records corresponding with a user identifier, transmitting the data records to the generative AI model, generating, within a first persistent dialogue session of the generative AI model, successive responses according to the sub-query sequence, and collating the successive responses into collated response data.

In some implementations, the document may include inaccessible text embedded in the document, and the method may further include processing the document, using optical character recognition, to transform the inaccessible text into the retrievable text.

In some implementations, the method may further include receiving, from a historical records repository, a historical query and a historical response corresponding to the historical query, applying a ground truth label to the historical response, transmitting the historical query to the generative AI model, decomposing, by using the generative AI model, the historical query into a training sub-query sequence in each of a first set of a predetermined number of distinct persistent dialogue sessions, wherein each training sub-query sequence may include a respective plurality of training sub-queries successively increasing in complexity, generating, by a second set of a predetermined number of distinct persistent dialogue sessions, wherein each of the second set of a predetermined number of distinct persistent dialogue sessions is provided with a corresponding training sub-query sequence, successive training responses according to the respective training sub-query sequence, determining a singular integrated training response for each of the successive training responses, each singular integrated training response being selected from the group consisting of (i) a final training response of the respective successive training response, and (ii) an aggregated training response having the respective successive training response aggregated by the generative AI model, determining a preferred generated training response and a corresponding preferred training sub-query sequence, the preferred generated training response being the singular integrated training response most similar to the historical response, and training the generative AI model to prioritize the preferred training sub-query sequence that output the preferred generated training response.

In some implementations, decomposing the historical query into a training sub-query sequence in each of the first set of the predetermined number of distinct persistent dialogue sessions is based on non-greedy decoding of at least one selected from the group consisting of top-k, top-p, and beam search.

In some implementations, the collated response data may include a data object having a key-value pair for each response of the successive responses.

In some implementations, collating the successive responses into the collated response data may include determining a singular integrated response from the successive responses, the singular integrated response being selected from the group consisting of (i) a final response of the successive responses, and (ii) an aggregated response having the successive responses aggregated by the generative AI model.

The above summary is provided merely for purposes of summarizing some example implementations to provide a basic understanding of some aspects of the present disclosure. Accordingly, it will be appreciated that the above-described implementations are merely examples and should not be construed to narrow the scope or spirit of the disclosure in any way. It will be appreciated that the scope of the present disclosure encompasses many potential implementations in addition to those here summarized, some of which will be further described below.

BRIEF DESCRIPTION OF THE DRAWINGS

Having thus described implementations of the disclosure in general terms, reference will now be made the accompanying drawings. The components illustrated in the Figures may or may not be present in certain implementations described herein. Some implementations may include fewer (or more) components than those shown in the Figures.

Figure 1A:
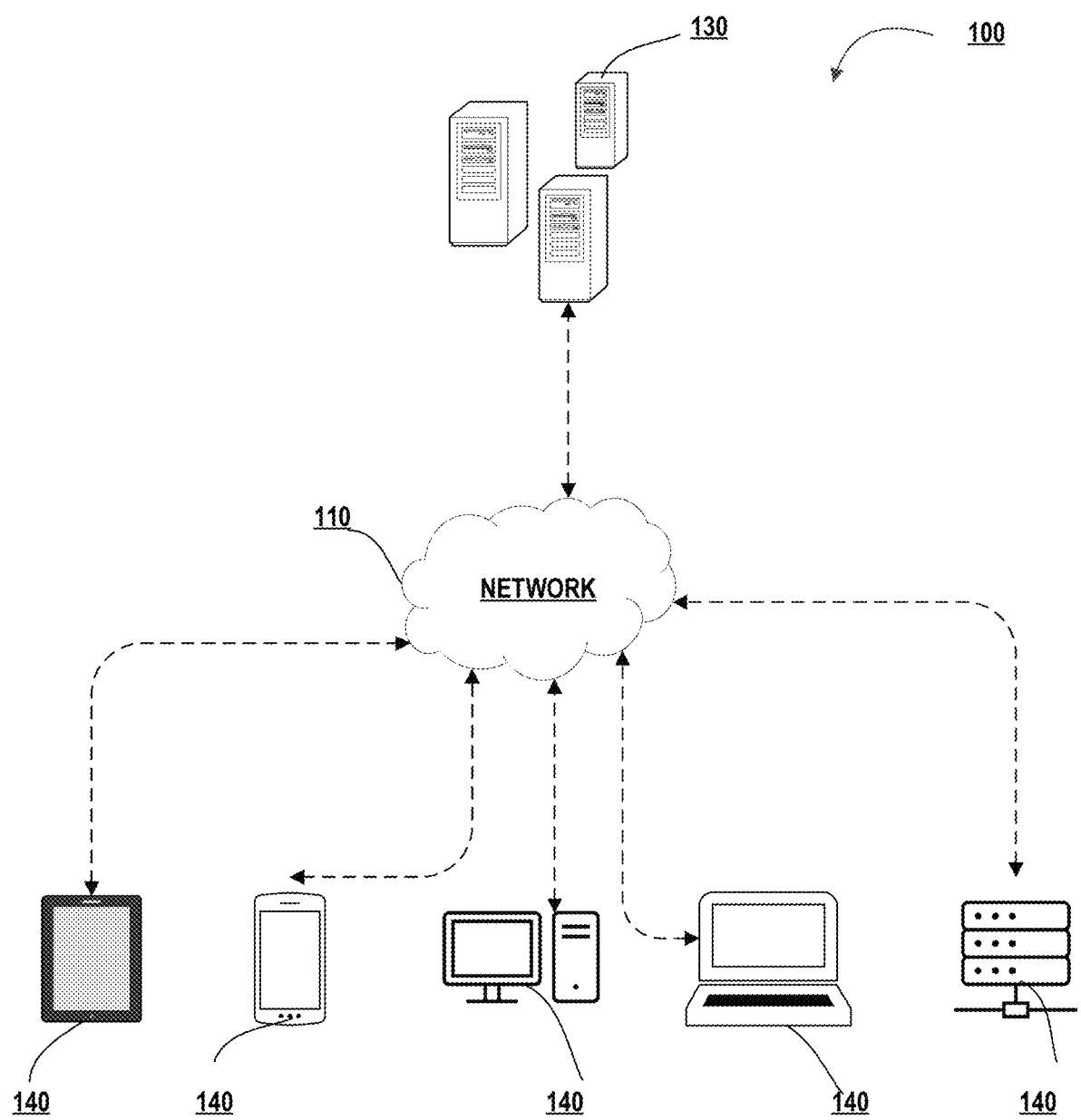
Figure 1B:
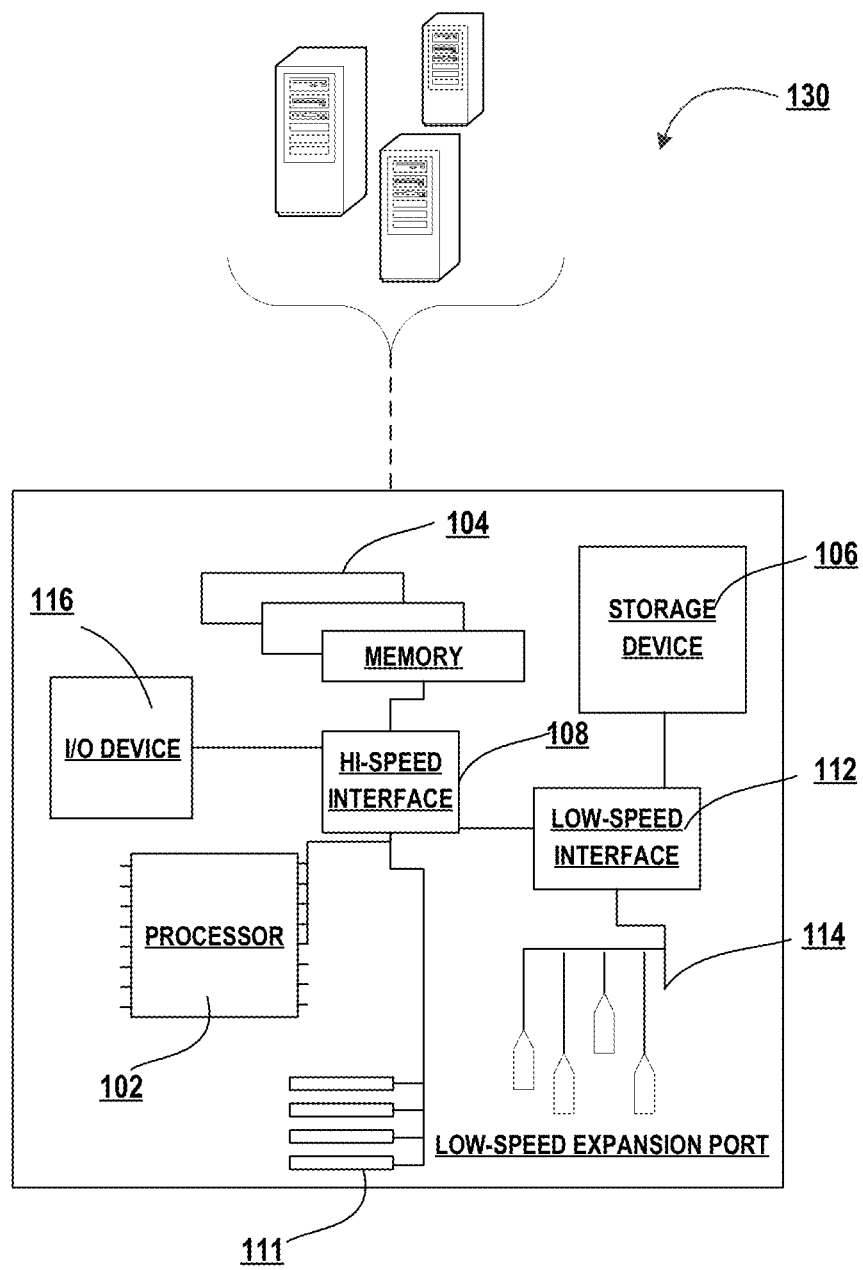
Figure 1C:
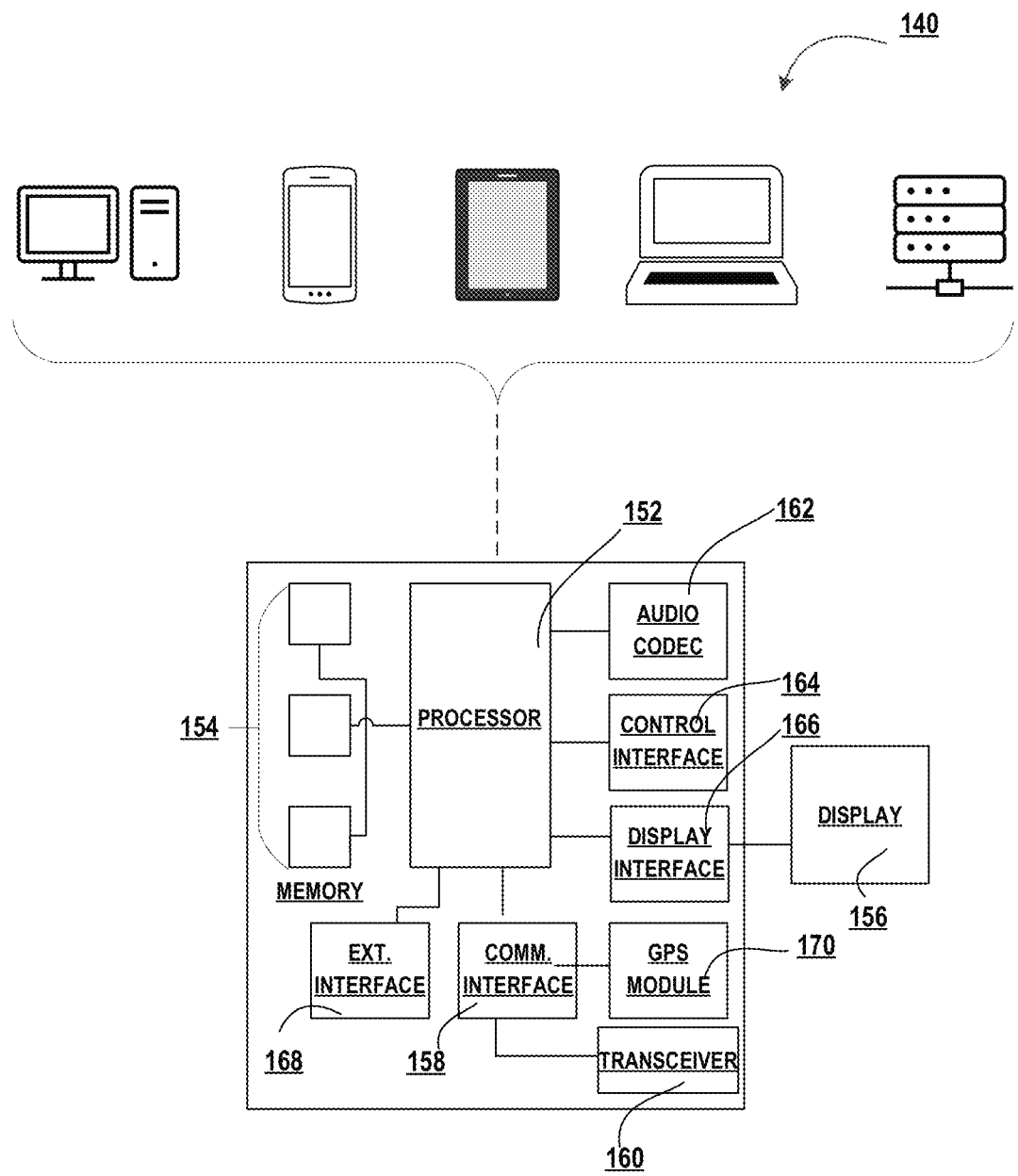
Figure 2:
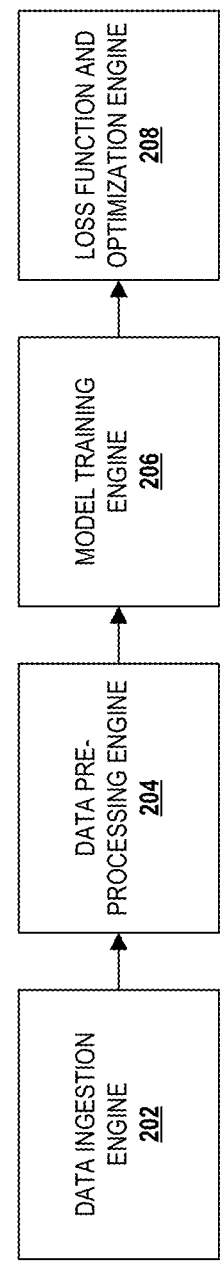
Figure 3:
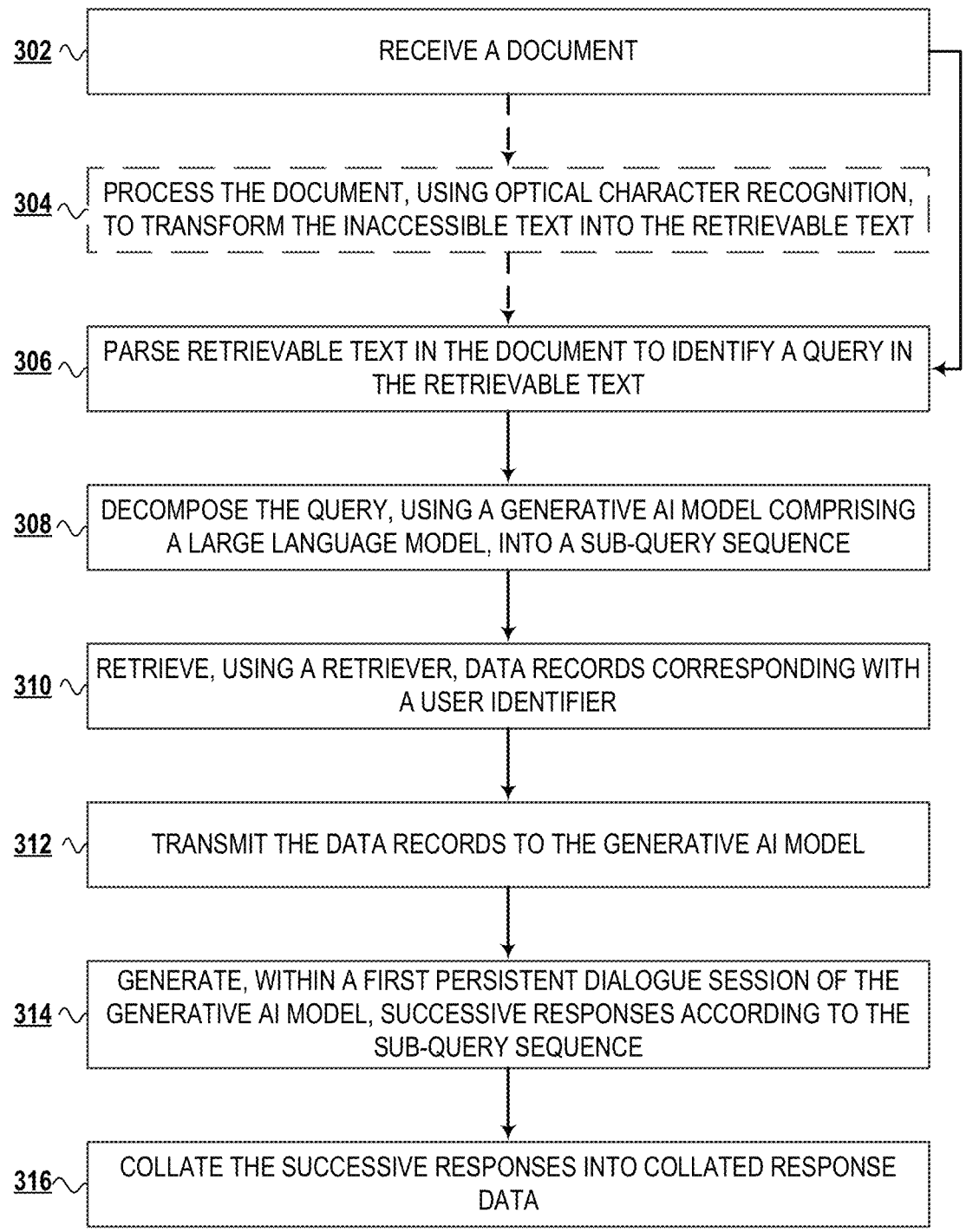
Figure 4:
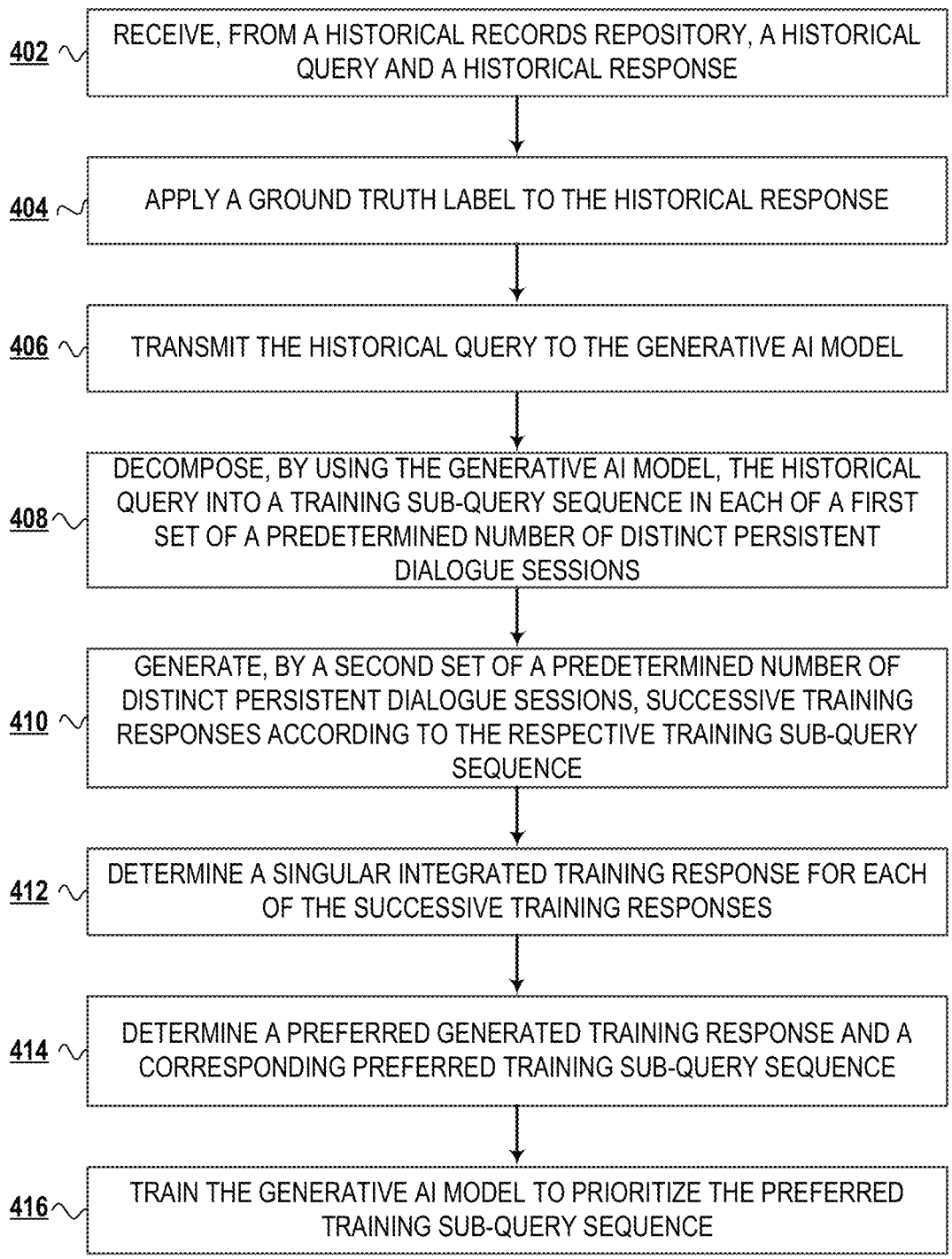
Figure 5:
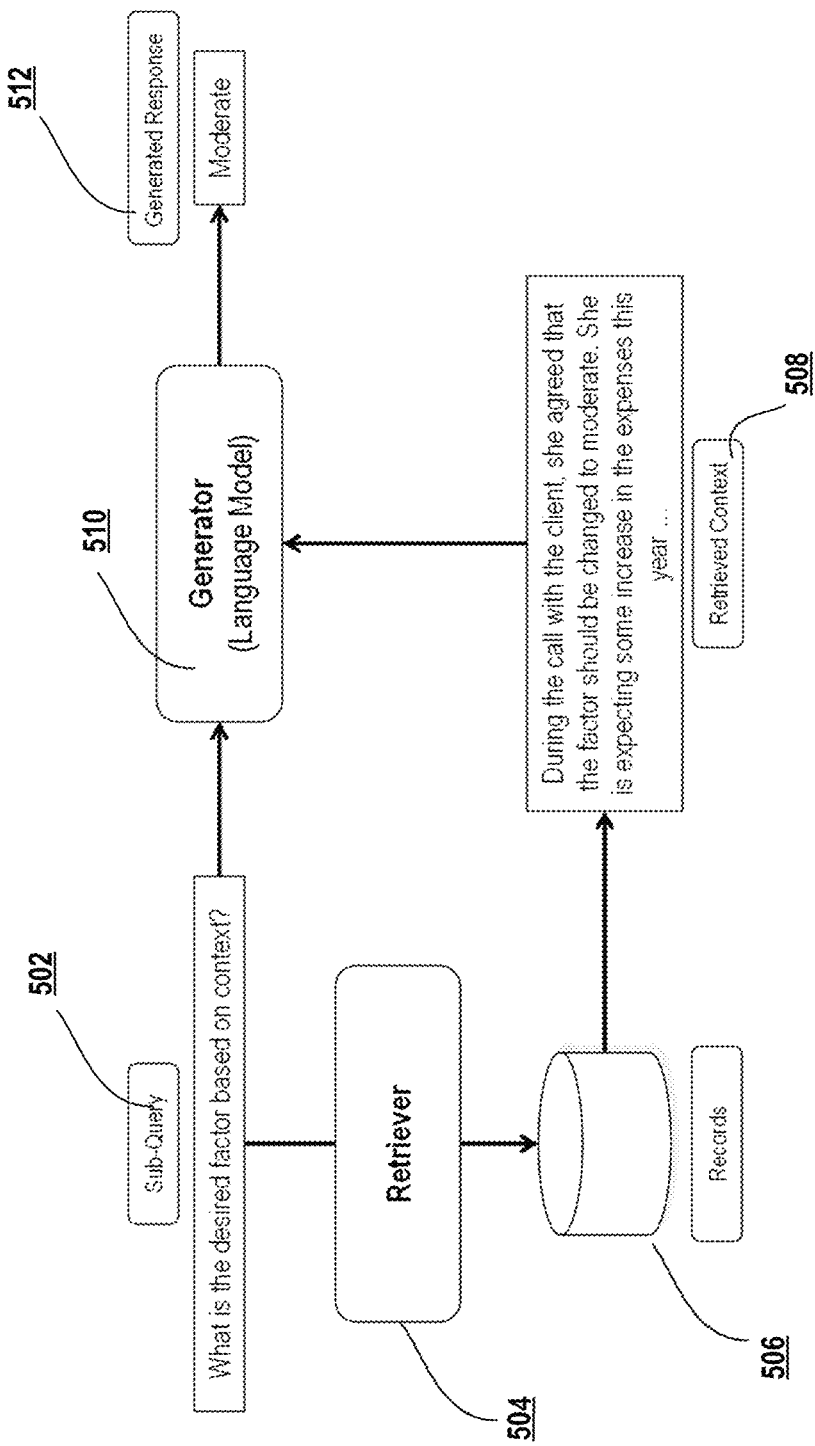
Figure 6:
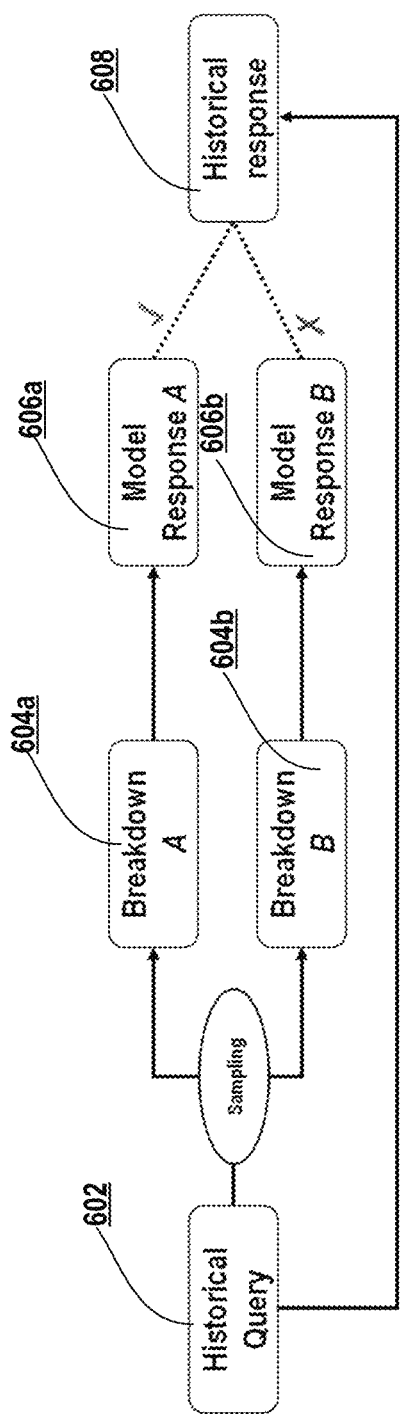

FIGS. 1A-1C illustrate technical components of an exemplary distributed computing environment for query interface response synthesis via machine learning and progressive query data decomposition, in accordance with an implementation of the disclosure;

FIG. 2 illustrates an exemplary generative AI model subsystem, in accordance with an implementation of the disclosure;

FIG. 3 illustrates a process flow for query interface response synthesis via machine learning and progressive query data decomposition, in accordance with an implementation of the disclosure;

FIG. 4 illustrates a process flow for training a generative AI model for query interface response synthesis via machine learning and progressive query data decomposition, in accordance with an implementation of the disclosure;

FIG. 5 illustrates a flow diagram for query interface response synthesis via machine learning and progressive query data decomposition, in accordance with an implementation of the disclosure; and FIG. 6 illustrates a flow diagram for query interface response synthesis via machine learning and progressive query data decomposition, in accordance with an implementation of the disclosure.

DETAILED DESCRIPTION

Implementations of the present disclosure will now be described more fully hereinafter with reference to the accompanying drawings, in which some, but not all, implementations of the disclosure are shown. Indeed, the disclosure may be implemented in many different forms and should not be construed as limited to the implementations set forth herein; rather, these implementations are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" may be also used herein. Furthermore, when it may be said herein that something may be "based on" something else, it may be based on one or more other things as well. In other words, unless expressly indicated otherwise, as used herein "based on" means "based at least in part on" or "based at least partially on." Like numbers refer to like elements throughout.

As used herein, an "entity" may be any institution employing information technology resources and particularly technology infrastructure configured for processing large amounts of data. Typically, these data can be related to the people who work for the entity, its products or applications, the customers or any other aspect of the operations of the entity. As such, the entity may be any institution, group, association, financial institution, establishment, company, union, authority or the like, employing information technology resources for processing large amounts of data.

As described herein, a "user" may be an individual associated with an entity. As such, in some implementations, the user may be an individual having past relationships, current relationships or potential future relationships with an entity. In some implementations, the user may be an employee (e.g., an associate, a project manager, an IT specialist, a manager, an administrator, an internal operations analyst, or the like) of the entity or enterprises affiliated with the entity.

As used herein, a "user interface" or "display" may be a point of human-computer interaction and communication in a device that allows a user to input information, such as commands or data, into a device, or that allows the device to output information to the user. For example, the user interface includes a graphical user interface (GUI) or an interface to input computer-executable instructions that direct a processing device to carry out specific functions. The user interface typically employs certain input and output devices such as a display, mouse, keyboard, button, touchpad, touch screen, microphone, speaker, LED, light, joystick, switch, buzzer, bell, and/or other user input/output device for communicating with one or more users.

As used herein, an "engine" or "module" or "model" may refer to core elements of a computer program, or part of a computer program that serves as a foundation for a larger piece of software and drives the functionality of the software. An engine may be self-contained, but externally controllable code that encapsulates powerful logic designed to perform or execute a specific type of function. In one aspect, an engine may be underlying source code that establishes file hierarchy, input and output methods, and how a specific part of a computer program interacts or communicates with other software and/or hardware. The specific components of an engine may vary based on the needs of the specific computer program as part of the larger piece of software. In some implementations, an engine may be configured to retrieve resources created in other computer programs, which may then be ported into the engine for use during specific operational aspects of the engine. An engine may be configurable to be implemented within any general-purpose computing system. In doing so, the engine may be configured to execute source code embedded therein to control specific features of the general-purpose computing system to execute specific computing operations, thereby transforming the general-purpose system into a specific purpose computing system. In some implementations, an engine may implement a machine learning model or generative AI model to perform functions as a foundation for the larger piece of software that drives the functionality of the software. The machine learning model or generative AI model for any given engine may be self-contained (e.g., without interaction with other engines), or the machine learning model or generative AI model may be shared across one or more engines. In other words, some implementations of the larger piece of software many implement multiple machine learning models or generative AI models to perform functions of the various engines. In other implementations, a single machine learning model or generative AI model may be shared across one or more engines to perform the functions attributed thereto as described herein.

It should also be understood that "operatively coupled," as used herein, means that the components may be formed integrally with each other, or may be formed separately and coupled together. Furthermore, "operatively coupled" means that the components may be formed directly to each other, or to each other with one or more components located between the components that are operatively coupled together. Furthermore, "operatively coupled" may mean that the components are detachable from each other, or that they are permanently coupled together. Furthermore, operatively coupled components may mean that the components retain at least some freedom of movement in one or more directions or may be rotated about an axis (i.e., rotationally coupled, pivotally coupled). Furthermore, "operatively coupled" may mean that components may be electronically connected and/or in fluid communication with one another.

It should be understood that the word "exemplary" may be used herein to mean "serving as an example, instance, or illustration." Any implementation described herein as "exemplary" is not necessarily to be construed as advantageous over other implementations.

As used herein, "determining" may encompass a variety of actions. For example, "determining" may include calculating, computing, processing, deriving, investigating, ascertaining, and/or the like. Furthermore, "determining" may also include receiving (e.g., receiving information), accessing (e.g., accessing data in a memory), and/or the like. Also, "determining" may include resolving, selecting, choosing, calculating, establishing, and/or the like. Determining may also include ascertaining that an element matches a predetermined criterion, including that a threshold has been met, passed, exceeded, and so on.

As used herein, a "dialogue session" or session may refer to a single instance of interaction involving a generative AI model, wherein the model receives inputs in a sequential manner. Such dialogue sessions may occur autonomously, without external interference, and may involve various forms of input, including predefined datasets or real-time data streams. After each input is provided, the model generates one corresponding output before processing the next input in the sequence. Within a given session, the model may be "persistent" such that it retains memory of previous inputs and outputs, allowing it to reference prior exchanges for context. However, this memory may be confined to the duration of the session and is not shared with other instances of the dialogue session unless explicitly instructed to carry over such information across dialogue sessions. The session may persist until the model completes its output generation or the interface may be otherwise disconnected.

The manual completion of questionnaires presents significant challenges for users. Users are often required to sift through large volumes of records, client communications, and historical data to extract the necessary information to answer (i.e., create responses to) the questionnaire's questions (i.e., queries) accurately. This process can be highly time-consuming, and users frequently face time constraints, particularly when managing a high volume of clients or dealing with urgent requests. Additionally, users may be forgetful or disorganized, especially when their interactions with clients are not properly documented or when important details from client meetings are not adequately noted. As a result, users may provide incomplete, vague, or even inaccurate responses to questionnaire items, which compromises the integrity of the client review process and may result in suboptimal or incorrect advice being provided to clients.

Efforts to automate this process have thus far failed to provide an effective solution. While machine learning algorithms can be trained to recognize patterns and generate responses based on available data, they struggle with the nuances and complexities of client-specific questions. For example, many client questionnaires involve subjective judgment or rely on subtle contextual details that are difficult for algorithms to interpret. As a result, machine-generated responses often miss key elements of the questions, leading to answers that are either too generalized or entirely inaccurate. The use of machine learning in these cases has therefore introduced additional layers of error, rather than mitigating existing issues, as these automated systems have not yet been able to adequately capture the breadth and depth of the questions being asked.

Addressing these challenges requires the establishment of a system and method for query interface response synthesis via machine learning and progressive query data decomposition, which provides for the implementation of a generative AI model to decompose queries from a questionnaire in manner that allows for responding to the queries on the questionnaire extremely accurately. In doing so, records of interactions can be leveraged by the generative AI model in formulating precise answers that are tailored specifically to a given user.

To do so, a generative AI model may be trained in a specific manner. After receiving a historical (e.g., previously recorded) query and historical response corresponding thereto, a ground truth label may be applied to the historical response. The historical query may then be transmitted to the generative AI model, where it may be decomposed into multiple different sub-query sequences for training. Each of these sub-query sequences may be generated by decomposing the historical query in independent sessions of the generative AI model, such that each sub-query sequence may be generated independently of the others. Individually, each sub-query sequence may then be provided its own independent session of the generative AI model to elicit responses for the sub-query sequence's corresponding sub-queries. Then, for each series of responses (e.g., the results of providing sub-queries of a sub-query sequence to individual sessions of the generative AI model), an integrated response for each may be determined. These integrated responses may then be compared to the historical response to determine which sub-query sequence resulted in an integrated response most closely resembling the historical response. The generative AI model may be then trained to prefer such a sub-query sequence for improvement of future decomposing of queries.

Having obtained a trained generative AI model, a document containing retrievable text may be received, and parsed to identify one or more queries in the document. For each query identified, the query may then be decomposed using the generative AI model to obtain a corresponding sub-query sequence. From data records corresponding with a user identifier for whom the document is to be completed, the data records may be transmitted to the generative AI model. Within a persistent dialogue session of the generative AI model, the sub-query sequence determined from a given query may be provided, in sequence, to the generative AI model to generate successive responses according to the sub-query sequence. These successive responses may then be collated into collated response data to be structured in a data object or inserted into a template to form the completed document.

What is more, the present disclosure provides a technical solution to a technical problem. As described herein, the technical problem includes the inability for systems to recognize patterns and generate responses based on available data, while struggling with the nuances and complexities of client-specific questions. The present disclosure embraces an improvement over existing solutions by allowing for query response generation (i) with fewer steps to achieve the solution (e.g., directly using interaction data from data records to generate responses to queries instead of redundant searching of the data records for each query), thus reducing the amount of network resources, such as processing resources, storage resources, network resources, and/or the like, that are being used, (ii) providing a more accurate solution to problem, thus reducing the number of resources required to remedy any errors made due to a less accurate solution (e.g., by training a generative AI model using progressive breakdowns of queries, and preferences for the most accurate breakdowns, the generated responses to queries are much more accurate), (iii) removing manual input and waste from the implementation of the solution, thus improving speed and efficiency of the process and conserving network resources (e.g., eliminating, by using generative AI, the need to manually complete documents having queries and eliminating the need to perform research into past correspondence with users to gather information to complete the queries), (iv) determining an optimal amount of resources that need to be used to implement the solution, thus reducing network traffic and load on existing network resources. In other words, the solution may bypass a series of steps previously implemented, thus further conserving network resources. Furthermore, the technical solution described herein uses a rigorous, computerized process to perform specific tasks and/or activities that were not previously performed.

FIGS. 1A-1C illustrate technical components of an exemplary distributed computing environment 100 for query interface response synthesis via machine learning and progressive query data decomposition, in accordance with an implementation of the disclosure. As shown in FIG. 1A, the distributed computing environment 100 contemplated herein may include a system 130, an endpoint device(s) 140, and a network 110 over which the system 130 and endpoint device(s) 140 communicate therebetween. FIG. 1A illustrates only one example of an implementation of the distributed computing environment 100, and it will be appreciated that in other implementations one or more of the systems, devices, and/or servers may be combined into a single system, device, or server, or be made up of multiple systems, devices, or servers. Also, the distributed computing environment 100 may include multiple systems, same or similar to system 130, with each system providing portions of the necessary operations (e.g., as a server bank, a group of blade servers, or a multi-processor system).

In some implementations, the system 130 and the endpoint device(s) 140 may have a client-server relationship in which the endpoint device(s) 140 are remote devices that request and receive application from a centralized server, i.e., the system 130. In some other implementations, the system 130 and the endpoint device(s) 140 may have a peer-to-peer relationship in which the system 130 and the endpoint device(s) 140 are considered equal and all have the same abilities to use the resources available on the network 110. Instead of having a central server (e.g., system 130) which would act as the shared drive, each device that is connect to the network 110 would act as the server for the files stored on it.

The system 130 may represent various forms of servers, such as web servers, database servers, file server, or the like, various forms of digital computing devices, such as laptops, desktops, video recorders, audio/video players, radios, workstations, or the like, or any other auxiliary network devices, such as wearable devices, Internet-of-things devices, electronic kiosk devices, entertainment consoles, mainframes, or the like, or any combination of the aforementioned.

The endpoint device(s) 140 may represent various forms of electronic devices, including user input devices such as personal digital assistants, cellular telephones, smartphones, laptops, desktops, and/or the like, input devices such as resource transfer terminals, electronic resource transfer units, and/or the like, electronic telecommunications device (e.g., automated teller machine (ATM)), and/or edge devices such as routers, routing switches, integrated access devices (IAD), and/or the like.

The network 110 may be a distributed network that is spread over different networks. This provides a single data communication network, which can be managed jointly or separately by each network. In addition to shared communication within the network, the distributed network often also supports distributed processing. The network 110 may be a form of digital communication network such as a telecommunication network, a local area network ("LAN"), a wide area network ("WAN"), a global area network ("GAN"), the Internet, or any combination of the foregoing. The network 110 may be secure and/or unsecure and may also include wireless and/or wired and/or optical interconnection technology.

It is to be understood that the structure of the distributed computing environment and its components, connections and relationships, and their functions, are meant to be exemplary only, and are not meant to limit implementations of the disclosures described and/or claimed in this document. In one example, the distributed computing environment 100 may include more, fewer, or different components. In another example, some or all of the portions of the distributed computing environment 100 may be combined into a single portion or all of the portions of the system 130 may be separated into two or more distinct portions.

FIG. 1B illustrates an exemplary component-level structure of the system 130, in accordance with an implementation of the disclosure. As shown in FIG. 1B, the system 130 may include a processing device 102, memory 104, input/output (I/O) device 116, and a storage device 106. The system 130 may also include a high-speed interface 108 connecting to the memory 104, and a low-speed interface 112 connecting to a low-speed bus 114 and a storage device 106. Each of the components 102, 104, 108, 110, and 112 may be operatively coupled to one another using various buses and may be mounted on a common motherboard or in other manners as appropriate. As described herein, the processing device 102 may include a number of subsystems to execute the portions of processes described herein. Each subsystem may be a self-contained component of a larger system (e.g., system 130) and capable of being configured to execute specialized processes as part of the larger system.

The processing device 102 can process instructions, such as instructions of an application that may perform the functions disclosed herein. These instructions may be stored in the memory 104 (e.g., non-transitory storage device) or on the storage device 106, for execution within the system 130 using any subsystems described herein. It is to be understood that the system 130 may use, as appropriate, multiple processing devices, along with multiple memories, and/or I/O devices, to execute the processes described herein. In other words, as used herein, a "processing device" means one processing device (e.g., a microprocessor) that performs the defined functions or a plurality of processing devices (e.g., microprocessors) that collectively perform defined functions such that the execution of the individual defined functions may be divided amongst such processing devices.

The memory 104 stores information within the system 130. In one implementation, the memory 104 is a volatile memory unit or units, such as volatile random access memory (RAM) having a cache area for the temporary storage of information, such as a command, a current operating state of the distributed computing environment 100, an intended operating state of the distributed computing environment 100, instructions related to various methods and/or functionalities described herein, and/or the like. In another implementation, the memory 104 is a non-volatile memory unit or units. The memory 104 may also be another form of computer-readable medium, such as a magnetic or optical disk, which may be embedded and/or may be removable. The non-volatile memory may additionally or alternatively include an EEPROM, flash memory, and/or the like for storage of information such as instructions and/or data that may be read during execution of computer instructions. The memory 104 may store, recall, receive, transmit, and/or access various files and/or information used by the system 130 during operation.

The storage device 106 is capable of providing mass storage for the system 130. In one aspect, the storage device 106 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly implemented in an information carrier. The computer program product may also contain instructions that, when executed, perform one or more methods, such as those described above. The information carrier may be a non-transitory computer- or machine-readable storage medium, such as the memory 104, the storage device 106, or memory on processing device 102.

The high-speed interface 108 manages bandwidth-intensive operations for the system 130, while the low-speed controller 112 manages lower bandwidth-intensive operations. Such allocation of functions is exemplary only. In some implementations, the high-speed interface 108 is coupled to memory 104, input/output (I/O) device 116 (e.g., through a graphics processor or accelerator), and to high-speed expansion ports 111, which may accept various expansion cards (not shown). In such an implementation, low-speed controller 112 is coupled to storage device 106 and low-speed expansion port 114. The low-speed expansion port 114, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The system 130 may be implemented in a number of different forms. For example, the system 130 may be implemented as a standard server, or multiple times in a group of such servers. Additionally, the system 130 may also be implemented as part of a rack server system or a personal computer such as a laptop computer. Alternatively, components from system 130 may be combined with one or more other same or similar systems and an entire system 130 may be made up of multiple computing devices communicating with each other.

FIG. 1C illustrates an exemplary component-level structure of the endpoint device(s) 140, in accordance with an implementation of the disclosure. As shown in FIG. 1C, the endpoint device(s) 140 includes a processing device 152, memory 154, an input/output device such as a display 156, a communication interface 158, and a transceiver 160, among other components. The endpoint device(s) 140 may also be provided with a storage device, such as a microdrive or other device, to provide additional storage. Each of the components 152, 154, 158, and 160, are interconnected using various buses, and several of the components may be mounted on a common motherboard or in other manners as appropriate.

The processing device 152 is configured to execute instructions within the endpoint device(s) 140, including instructions stored in the memory 154, which in one implementation includes the instructions of an application that may perform the functions disclosed herein, including certain logic, data processing, and data storing functions. The processing device may be implemented as a chipset of chips that include separate and multiple analog and digital processors. The processing device may be configured to provide, for example, for coordination of the other components of the endpoint device(s) 140, such as control of user interfaces, applications run by endpoint device(s) 140, and wireless communication by endpoint device(s) 140.

The processing device 152 may be configured to communicate with the user through control interface 164 and display interface 166 coupled to a display 156. The display 156 may be, for example, a TFT LCD (Thin-Film-Transistor Liquid Crystal Display) or an OLED (Organic Light Emitting Diode) display, or other appropriate display technology. The display interface 156 may comprise appropriate circuitry and configured for driving the display 156 to present graphical and other information to a user. The control interface 164 may receive commands from a user and convert them for submission to the processing device 152. In addition, an external interface 168 may be provided in communication with processing device 152, so as to enable near area communication of endpoint device(s) 140 with other devices. External interface 168 may provide, for example, for wired communication in some implementations, or for wireless communication in other implementations, and multiple interfaces may also be used.

The memory 154 stores information within the endpoint device(s) 140. The memory 154 can be implemented as one or more of a computer-readable medium or media, a volatile memory unit or units, or a non-volatile memory unit or units. Expansion memory may also be provided and connected to endpoint device(s) 140 through an expansion interface (not shown), which may include, for example, a SIMM (Single In Line Memory Module) card interface. Such expansion memory may provide extra storage space for endpoint device(s) 140 or may also store applications or other information therein. In some implementations, expansion memory may include instructions to carry out or supplement the processes described above and may include secure information also. For example, expansion memory may be provided as a security module for endpoint device(s) 140 and may be programmed with instructions that permit secure use of endpoint device(s) 140. In addition, secure applications may be provided via the SIMM cards, along with additional information, such as placing identifying information on the SIMM card in a non-hackable manner.

The memory 154 may include, for example, flash memory and/or NVRAM memory. In one aspect, a computer program product is tangibly implemented in an information carrier. The computer program product contains instructions that, when executed, perform one or more methods, such as those described herein. The information carrier is a computer- or machine-readable medium, such as the memory 154, expansion memory, memory on processing device 152, or a propagated signal that may be received, for example, over transceiver 160 or external interface 168.

In some implementations, the user may use the endpoint device(s) 140 to transmit and/or receive information or commands to and from the system 130 via the network 110. Any communication between the system 130 and the endpoint device(s) 140 may be subject to an authentication protocol allowing the system 130 to maintain security by permitting only authenticated users (or processes) to access the protected resources of the system 130, which may include servers, databases, applications, and/or any of the components described herein. To this end, the system 130 may trigger an authentication subsystem that may require the user (or process) to provide authentication credentials to determine whether the user (or process) is eligible to access the protected resources. Once the authentication credentials are validated and the user (or process) is authenticated, the authentication subsystem may provide the user (or process) with permissioned access to the protected resources. Similarly, the endpoint device(s) 140 may provide the system 130 (or other client devices) permissioned access to the protected resources of the endpoint device(s) 140, which may include a GPS device, an image capturing component (e.g., camera), a microphone, and/or a speaker.

The endpoint device(s) 140 may communicate with the system 130 through communication interface 158, which may include digital signal processing circuitry where necessary. Communication interface 158 may provide for communications under various modes or protocols, such as the Internet Protocol (IP) suite (commonly known as TCP/IP). Protocols in the IP suite define end-to-end data handling methods for everything from packetizing, addressing and routing, to receiving. Broken down into layers, the IP suite includes the link layer, containing communication methods for data that remains within a single network segment (link); the Internet layer, providing internetworking between independent networks; the transport layer, handling host-to-host communication; and the application layer, providing process-to-process data exchange for applications. Each layer contains a stack of protocols used for communications. In addition, the communication interface 158 may provide for communications under various telecommunications standards (2G, 3G, 4G, 5G, and/or the like) using their respective layered protocol stacks. These communications may occur through a transceiver 160, such as radio-frequency transceiver. In addition, short-range communication may occur, such as using a Bluetooth, Wi-Fi, or other such transceiver (not shown). In addition, GPS (Global Positioning System) receiver module 170 may provide additional navigation- and location-related wireless data to endpoint device(s) 140, which may be used as appropriate by applications running thereon, and in some implementations, one or more applications operating on the system 130.

The endpoint device(s) 140 may also communicate audibly using audio codec 162, which may receive spoken information from a user and convert the spoken information to usable digital information. Audio codec 162 may likewise generate audible sound for a user, such as through a speaker, e.g., in a handset of endpoint device(s) 140. Such sound may include sound from voice telephone calls, may include recorded sound (e.g., voice messages, music files, etc.) and may also include sound generated by one or more applications operating on the endpoint device(s) 140, and in some implementations, one or more applications operating on the system 130.

Various implementations of the distributed computing environment 100, including the system 130 and endpoint device(s) 140, and techniques described here can be realized in digital electronic circuitry, integrated circuitry, specially designed ASICs (application specific integrated circuits), computer hardware, firmware, software, and/or combinations thereof.

FIG. 2 illustrates an exemplary generative AI subsystem 200, in accordance with an implementation of the invention. The generative AI subsystem 200 may include a data ingestion engine 202, a data pre-processing engine 204, a model training engine 206, and a loss function and optimization engine 208. It should be understood that the generative AI subsystem 200 is merely an example, and other implementations may include more, fewer, or different components depending on the specific requirements and implementations of the system. For instance, additional engines for data validation, feature selection, or distributed computing may be integrated into the subsystem, or certain components described herein may be consolidated or omitted based on system performance objectives. Therefore, the generative AI subsystem 200 should not be considered limiting and may be adapted to various configurations within the scope of the invention.

The data ingestion engine 202 may identify various internal and/or external data sources to generate, test, and/or integrate new features for training the generative AI model. These internal and/or external data sources (e.g., text corpora, web-based text data, document repositories, or decentralized text storage system) may be initial locations where the data originates or where physical information is first digitized. In addition to conventional data sources, the data ingestion engine 202 may support decentralized storage systems, such as blockchain-based data sources, and privacy-preserving methods such as differential privacy. The data ingestion engine 202 may identify the location of the data and describe connection characteristics for access and retrieval of data. In some implementations, data is transported from each data source using any applicable network protocols, such as the File Transfer Protocol (FTP), HyperText Transfer Protocol (HTTP), or any of the myriad Application Programming Interfaces (APIs) provided by websites, networked applications, and other services. In some implementations, the these data sources may include Enterprise Resource Planning (ERP) databases that host data related to day-to-day business activities such as accounting, procurement, project management, exposure management, supply chain operations, and/or the like, mainframe that is often the entity's central data processing center, edge devices that may be any piece of hardware, such as sensors, actuators, gadgets, appliances, or machines, that are programmed for certain applications and can transmit data over the internet or other networks, and/or the like.

Depending on the nature of the data, the data ingestion engine 202 may move the data to a destination for storage or further analysis. Typically, the data may be in varying formats as they come from different sources, including RDBMS, other types of databases, S3 buckets, CSVs, or from streams. For a large language model ("LLM"), text data may originate from sources such as web scrapes, social media, large public text datasets, or the like. Since the data comes from different places, it needs to be cleansed and transformed so that it can be analyzed together with data from other sources. The data may be ingested in real-time, using stream processing, in batches using a batch data warehouse, or a combination of both. Stream processing may be used to process continuous data stream (e.g., data from edge devices), i.e., computing on data directly as it is received, and filter the incoming data to retain specific portions that are deemed useful by aggregating, analyzing, transforming, and ingesting the data. On the other hand, the batch data warehouse collects and transfers data in batches according to scheduled intervals, trigger events, or any other logical ordering.

In machine learning, the quality of data and the useful information that can be derived therefrom directly affects the ability of the machine learning model to learn. The data pre-processing engine 204 may implement advanced integration and processing steps needed to prepare the data for machine learning execution, including tokenization, text normalization, and removal of irrelevant elements like HTML tags in web-based data, especially for LLM training. This may include modules to perform any upfront, data transformation to consolidate the data into alternate forms by changing the value, structure, or format of the data using generalization, normalization, attribute selection, and aggregation, text-specific transformations such as stemming and lemmatization, data cleaning by filling missing values, smoothing the noisy data, resolving the inconsistency, and removing outliers, and/or any other encoding steps as needed. In some implementations, the data pre-processing engine 204 may perform real-time pre-processing at the edge via edge computing devices, allowing for the transformation and reduction of data prior to transmission to centralized locations, thereby reducing latency and conserving network bandwidth.

In addition to improving the quality of the data, the data pre-processing engine 204 may transform categorical data into numerical formats that are suitable for machine learning algorithms. In this regard, the data pre-processing engine 204 may use techniques such as one-hot encoding or label encoding depending on the nature of the categorical variables and the intended use of the data.

In some implementations, the data pre-processing engine 204 may also include dimensionality reduction techniques, where the number of input features is reduced while retaining the most relevant information. In this regard, the data pre-processing engine 204 may include methods such as Principal Component Analysis (PCA) or apply feature selection algorithms to remove redundant or irrelevant features, thereby reducing the computational complexity of the model training phase. Feature selection may be particularly beneficial in datasets with a high number of features, ensuring that the generative AI models do not overfit to noise or irrelevant details. The pre-processed data output from the data pre-processing engine 204 may then be fed into the model training module 206.

The model training engine 206 may be responsible for training the generative AI models using the pre-processed data from the data pre-processing engine 204. The model training engine 206 may implement various machine learning algorithms, including but not limited to Generative Adversarial Networks (GANs), Variational Autoencoders (VAEs), transformers, diffusion models, or other specialized architectures depending on the specific requirements of the system. These models may be used in a broad range of applications, such as LLMs for text generation, image generation models, video synthesis models, audio generation models, and/or the like. The model training engine 206 may optimize these models by continuously adjusting their internal parameters based on the patterns and relationships identified within the data.

In some implementations, the model training engine 206 may include a training data handler, which manages the partitioning of the pre-processed data into training, validation, and testing datasets. The training data is used to update the model's parameters, while the validation and testing datasets are reserved to evaluate the model's performance during and after training. The model training engine 206 may support various data-handling strategies, such as cross-validation or random shuffling, to ensure that the model generalizes well and is not overfitting to the training data.

In implementations involving large language models, the model training engine 206 may utilize transformer-based architectures, such as the Transformer, BERT, GPT, or the like. Transformer models rely on mechanisms like self-attention to capture dependencies between words in a sequence, regardless of their distance from one another. The self-attention mechanism allows the model to weigh the importance of different words in a sentence and establish complex relationships important for understanding context. During training, the model may process vast amounts of text data and learn to predict the next word or token in a sequence based on the input context. This training process allows LLMs to generate coherent text, complete sentences, translate languages, or answer questions based on learned patterns from the data.

The transformer-based LLMs may be trained using autoregressive (e.g., GPT) or masked-language modeling techniques (e.g., BERT). In autoregressive models, the training process may include predicting the next word in a sequence by progressively revealing more context to the model. The model iteratively improves its predictions based on its performance during prior iterations. Masked-language modeling involves masking certain words in a sentence and training the model to correctly predict the masked words based on surrounding context. Both approaches enable LLMs to capture intricate patterns in human language, improving their ability to handle tasks such as summarization, translation, and text generation. Loss functions like cross-entropy loss may be used to optimize the model's performance by comparing predicted tokens with the actual tokens in the dataset to guide the model to minimize prediction errors during training.

In implementations involving image generation models, the model training engine 206 may utilize transformer-based architectures, such as Vision Transformers (ViTs) or generative adversarial networks (GANs). Vision Transformers rely on self-attention mechanisms to process images as sequences of patches rather than whole images, allowing the model to capture spatial dependencies and patterns across the image. During training, the model may be exposed to large datasets containing diverse image types to learn features like textures, edges, and shapes. The model may then generate or reconstruct images by interpreting these patterns and applying learned spatial relationships. GAN-based models may also be used, where a generator network creates images, and a determinator network evaluates their realism, enabling the model to improve through adversarial training.

Image generation models may employ various training techniques, such as pixel-wise reconstruction or adversarial training, depending on the architecture. Pixel-wise reconstruction methods involve learning to reconstruct an image from its corrupted or downscaled version, optimizing the model to minimize the difference between the predicted and actual pixels (e.g., using mean squared error as the loss function). Adversarial training, often used with GANs, involves iteratively improving the generator network to produce images that are increasingly indistinguishable from real images, based on feedback from the determinator network. These approaches allow the model to capture complex visual features, enabling applications such as image synthesis, enhancement, and style transfer.

For video generation models, the model training engine 206 may employ transformer-based architectures like Video Transformers or GAN-based models specifically designed for handling temporal sequences. Video Transformers use self-attention mechanisms to model dependencies not only between pixels within a single frame but also across frames, allowing them to understand temporal relationships and motion patterns in videos. The model may be trained on large video datasets, enabling it to learn and reproduce dynamic changes and interactions between objects over time. GAN-based video models may incorporate spatiotemporal networks to evaluate the realism of generated video sequences, optimizing the model to produce continuous and coherent frames.

Video generation models may utilize spatial-temporal modeling techniques or adversarial training for generating realistic motion and video sequences. Spatial-temporal modeling involves learning the spatial features within each frame while simultaneously capturing the temporal dependencies between frames, optimizing the model's ability to predict future frames or complete missing sequences. Loss functions like mean squared error or perceptual loss may be applied to reduce discrepancies between predicted and actual frames. Adversarial training, on the other hand, may involve a generator creating video sequences and a determinator evaluating their realism, encouraging the generator to improve by minimizing the discrepancy identified by the determinator. These techniques may enable video generation models to create coherent and realistic sequences, useful in applications such as video synthesis and animation.

In audio generation models, the model training engine 206 may utilize architectures such as Audio Transformers or recurrent neural networks (RNNs) like WaveNet, designed to handle sequential and waveform data. Audio Transformers leverage attention mechanisms to capture relationships between segments of audio, allowing them to model temporal dependencies and predict the next audio sample based on previous context. During training, the model may process large audio datasets containing diverse sound patterns to learn representations of different audio features, such as frequency, amplitude, and harmonics. This training enables the model to generate coherent audio sequences, including speech, music, or ambient sounds, by synthesizing these learned patterns.

Audio generation models may be trained using sequence modeling techniques or autoregressive methods, depending on the architecture. Sequence modeling techniques involve processing and predicting sequences of audio samples, optimizing the model to capture and reproduce temporal dependencies in sound. Autoregressive methods, such as those employed in WaveNet, focus on predicting each audio sample based on prior samples, progressively refining the generated audio sequence over multiple iterations. Loss functions like mean absolute error or cross-entropy loss may be used to minimize the error between predicted and actual audio samples, guiding the model to improve its accuracy. These approaches allow audio generation models to create continuous and realistic audio outputs, applicable in areas such as speech synthesis, music generation, and sound effect creation.

The reconstruction loss ensures that the difference between the original input and the reconstructed output is minimized, guiding the decoder to generate outputs that closely resemble the input data. The second component, KL divergence loss, regularizes the latent space by ensuring that the distribution of latent variables conforms to a predefined probabilistic distribution, often a Gaussian distribution. This constraint encourages the model to learn a well-organized and smooth latent space, allowing for meaningful sampling from this space during inference. By combining these loss functions, the VAE can learn a latent space that not only captures the underlying patterns in the data but also allows for the generation of novel outputs by sampling new points from this space. During the inference phase, the trained model can sample random points from the latent space to generate new, previously unseen data instances.

In training generative AI models, the model training engine 206 may implement optimization techniques such as gradient clipping, learning rate scheduling, and mixed-precision training. Gradient clipping may be used to stabilize the training process, especially in transformer-based models, by capping the magnitude of gradients to prevent them from becoming excessively large. Learning rate scheduling may involve gradually increasing the learning rate during initial training phases (warm-up) and then decaying it as training progresses to fine-tune the model's parameters more effectively. Mixed-precision training, which leverages lower-precision (e.g., float16) arithmetic while retaining higher precision (e.g., float32) for specific calculations, may be used to accelerate training and reduce memory consumption, enabling the model to scale efficiently even when trained on large datasets.

In some implementations, the model training engine 206 may implement early stopping mechanisms to prevent overfitting. Early stopping monitors the generative AI model's performance on the validation dataset, halting the training process if the performance does not improve after a specified number of iterations. This ensures that the generative AI model does not continue training on noise or irrelevant patterns, which could degrade its performance on unseen data. The model training engine 206 may also support distributed training across multiple computing nodes, allowing the system to scale its computational resources as needed. Distributed training may involve splitting the generative AI model and data across multiple machines or GPUs, where each node processes a portion of the data and updates the model in parallel. This may be particularly useful for large datasets or models that require significant computational power, such as deep generative models. The model training engine 206 may synchronize the updates across the nodes using techniques like synchronous or asynchronous gradient descent.

Once the generative AI model is trained, the model training engine 206 may save the final trained generative AI model in a persistent storage location for future use. In specific implementations, metadata such as the number of epochs, the final loss values, and values of learned parameters may be logged for model versioning and/or retraining at a later stage. In some implementations, the model training engine 206 may also implement transfer learning, where a pre-trained model may be fine-tuned on a smaller, domain-specific dataset. This may reduce the amount of time and data required to train a new model, especially in cases where the available data may be limited or highly specialized. The model training engine 206 may adjust the parameters of the pre-trained model to better align with the new dataset, while preserving the learned features from the original training.

In implementations involving LLMs, new output may be generated by sampling from the model's probability distribution of tokens, conditioned on the context provided as input. Transformer-based architectures, such as GPT, use an auto-regressive approach where the model predicts the next token in a sequence one step at a time, using previously generated tokens as input for subsequent predictions. The process starts with a prompt or an initial sequence of words, and the model iteratively generates new tokens, forming coherent sentences or paragraphs based on the learned context and language patterns. For masked-language modeling (e.g., BERT), new output may be generated by filling in masked parts of the input sequence, allowing the model to complete sentences or generate variations of the provided text. The generated output can be controlled by adjusting parameters which influence the randomness of the token sampling, enabling the generation of diverse or deterministic responses.

In image generation models, such as those using ViTs or GANs, new output may be generated by sampling from the learned distribution in the model's latent space. For GANs, the generator network creates an image by transforming random noise vectors into structured image outputs through a series of layers that learn visual features like shapes, textures, and colors. The generated image may be then refined through adversarial feedback from the determinator network, which assesses the realism of the generated output. For transformer-based image models, the process may involve reconstructing images by assembling patches based on the learned dependencies between them. Input conditions, such as prompts describing desired features or specific noise vectors, guide the generation process, allowing for the creation of customized images or variations of existing visual styles. These models may also generate images based on style transfer techniques or predefined templates, synthesizing images that align with the characteristics present in the training data.

Video generation models utilize spatiotemporal dependencies to synthesize new video sequences based on the patterns learned during training. In transformer-based architectures, the model may generate video frames sequentially, predicting the next frame based on the input frames and the temporal context established by prior frames. GAN-based models, specifically designed for video synthesis, may sample noise vectors or use a sequence of frames as input, transforming these into continuous and temporally coherent video outputs through the generator network. The determinator evaluates the temporal consistency and realism of the output, ensuring the generated video mimics the motion dynamics and object interactions present in real-world video data. Such models may also use attention mechanisms to focus on critical elements within each frame and their evolution across time, facilitating realistic scene transitions and motion patterns. The generation process may include user-defined input such as initial frames, motion descriptions, or specific video attributes, providing control over the output.

Audio generation models, including Audio Transformers or autoregressive architectures like WaveNet, generate new audio sequences by predicting audio samples based on learned dependencies in sequential sound data. For autoregressive models, the generation process involves producing each audio sample one at a time, conditioned on previously generated samples, allowing the model to build complex audio patterns such as speech, music, or ambient sounds.

The model starts with an initial segment or a random seed and uses its learned parameters to predict and synthesize subsequent samples, constructing a continuous audio waveform. Audio Transformers, on the other hand, may use attention mechanisms to identify important temporal segments within the input audio and synthesize new output based on these learned patterns. The user can control the type of audio generated by providing parameters such as pitch, tempo, or initial sound clips, enabling the model to generate outputs tailored to specific use cases like speech synthesis, music composition, or environmental sound generation.

In some implementations, generative AI models may also integrate multiple modalities, enabling cross-modal generation where output in one modality influences or conditions the generation in another. For example, a video generation model may use text descriptions as input, synthesizing video content that aligns with the specified narrative or visual scene described. Similarly, image generation models may generate visual representations based on audio inputs, such as generating animations synchronized to musical rhythms or speech patterns. These cross-modal systems typically involve conditional GANs or multi-modal transformers, where the model processes input from one domain (e.g., text or audio) and learns to generate output in another domain (e.g., video or image) by aligning the patterns and dependencies between the different modalities. These models may allow users to generate complex, multimodal content based on combinations of inputs, such as using textual prompts to control the visual and auditory elements of a video.

It will be understood that the implementation of the generative AI subsystem 200 illustrated in FIG. 2 is exemplary and that other implementations may vary. The generative AI subsystem 200, as well as its constituent elements, may vary, and modifications or alternative configurations may be implemented without departing from the broader scope of the invention. For instance, different machine learning algorithms, data sources, optimization techniques, or training methodologies may be employed depending on system requirements, application domain, and available computational resources. Furthermore, features and functionalities described in one implementation may be combined with those of another implementation as needed, and vice versa.

FIG. 3 illustrates a process flow for query interface response synthesis via machine learning and progressive query data decomposition, in accordance with an implementation of the disclosure. At block 302, the system 130 may receive a document.

As used herein, a "document" may refer to any digital file that contains structured or unstructured data, including but not limited to text documents, spreadsheets, presentations, images, multimedia files, and databases. Examples of digital documents include word processing files (e.g., .docx, .odt), spreadsheets (e.g., .xlsx, .csv), slide presentations (e.g., .pptx, .odp), PDF files (e.g., .pdf), image files (e.g., .png, .jpeg), multimedia files (e.g., .mp4, .mp3), and various forms of markup or programming languages (e.g., .html, .xml, .json). Alternatively, a "document" may also refer to a physical paper document that has been converted into a digital format via scanning or other means, as will be described in detail later herein.

In some implementations, the "document" may also refer to an audio file. For example, an audio file may be transcribed using a natural language processing engine to result in a transcription of the audio file, resulting in a computer file of the aforementioned types, containing text.

In some implementations, the process may continue at block 304. The process at block 304 may be implemented in situations where the document includes inaccessible text. Inaccessible text may refer to text that may be in image-form or any other form that prevents a computer system from analyzing the text without the additional processing of block 304.

Indeed, if the text is embedded in the document and therefore inaccessible, the system 130 may use an optical character recognition engine to perform optical character recognition, which converts the inaccessible text into retrievable text to continue with the subsequent processing steps discussed hereinafter.

Continuing at block 306, the system 130 may parse retrievable text in the document to identify a query in the retrievable text. First, the retrievable text may be tokenized to separate individual words and punctuation marks. The parser may then scan for query-specific indicators such as the presence of a question mark or words such as "what," "why," "how," or the like. Once a question indicator has been detected, the system 130 may then identify the boundaries of the question by recognizing punctuation such as a question mark, period, exclamation point, or the like, and capital letters or numbers that typically signal the beginning of a new query or sentence. The system 130 may then mark the starting and ending positions of each query within the retrievable text based on these boundaries.

Next, at block 308, the system 130 may decompose the query using a generative AI model. The generative AI model may be a large language model, which, when provided with the query, may be capable of decomposing the query into a sub-query sequence. Put differently, the query may be provided alongside a prompt to expand the query into multiple sub-queries, provided in a sequence determined by the generative AI model, with the intention that if the sub-queries are provided in sequence to the generative AI model, or another generative AI model, the resulting answer (or "response") or group of responses would be representative of a more accurate response to the query than if the query were provided to the generative AI model without first breaking down the query into sub-queries.

The sub-queries within a sub-query sequence may be purposefully generated to be progressively (i.e., successively) more detailed (i.e., complex) throughout the sequence. For example, a query may be "confirm whether the portfolio need updates based on changes in client circumstances." If a sub-query sequence is generated by the generative AI model based on this query, the sub-query sequence may contain three sub-queries, the first sub-query may be "is investment tolerance mentioned in the client notes?" which may be a simple yes/no question. The second sub-query may be "what is the investment tolerance based on the client notes?" which inquires into more details based on the answer to the first sub-query. Finally, the third sub-query may be "did we discuss any change in the client circumstances in relation to the investment tolerance?" which inquires into even further details about the discussion surrounding the topic introduces in the first and second sub-queries.

The inventors have discovered that, in order to decompose the query in block 308 to achieve the desired outcome, the generative AI model may undergo specialized training. This training includes the incorporation of specific datasets, unique preprocessing techniques, and tailored optimization protocols. These adjustments ensure the performance of the generative AI model meets the technical requirements and functions as intended.

Accordingly, one process for training the generative AI model is described henceforth. Turning now to FIG. 4, a process flow for training a generative AI model for query interface response synthesis via machine learning and progressive query data decomposition is presented, in accordance with an implementation of the disclosure.

At block 402, the system 130 may receive a historical query, and a historical response corresponding to the historical query, from a historical records repository. The historical records repository may be a database or system designed for storing previously generated or saved queries and their corresponding responses. For example, questionnaires that have been manually completed for users at an earlier time may be stored for reference and use as will be described herein.

The historical records repository may take one or more of several different forms, such as relational databases, NoSQL databases, file systems, cloud storage, or distributed ledger technology. In relational or NoSQL databases, queries and responses from questionnaires may be stored as rows in tables or as key-value pairs, respectively. File systems and cloud storage allow the data to be saved as individual files, such as text, PDF, .docx, JSON, XML, or binary formats. In a distributed ledger, the queries and responses may be recorded as immutable transactions.

The file formats used to store this data can vary depending on the historical records repository type. Text files (.txt) or CSV files (.csv) might be used for simpler repositories, while structured formats like JSON (.json) or XML (.xml) may be used for more complex systems. In some cases, binary formats may be employed to optimize performance.

One historical query and historical response may be selected from the historical records repository to continue with the training. In other implementations, a group of historical queries and their corresponding responses may be selected, with the subsequent steps described herein being applied to each of the historical queries and responses in the group. Regardless, the steps described hereinafter may refer to a single historical query and corresponding historical response, though it shall be appreciated that such actions may be taken repetitiously through each historical query and historical response within a group.

At block 404, the system 130 may automatically apply a ground truth label to the historical response. Alternatively, in some implementations, the system 130 may receive an input from a user at an endpoint device 140 identifying the historical response as the ground truth, thus applying the ground truth label thereto. In doing so, the ground truth label acts as the "truth" against which predictions or outputs from the generative AI model being trained are to be compared. Stated differently, the training process herein may use the previously stored historical response as what a "good" response may be, since the historical response may have been completed by a human at an earlier date (e.g., days, months, years, decades prior). In this way, the generative AI model may ultimately learn to generate responses that closely resemble these "good" responses.

As such, the process may continue at block 406, where the system 130 transmits the historical query to the generative AI model. The historical query, being associated with the historical response labeled as a "ground truth" serves as a starting point.

At block 408, the generative AI model decomposes the historical query into a training sub-query sequence. The generative AI model may do this multiple times, resulting in multiple different training sub-query sequences. Each time the generative AI model decomposes the historical query into a training sub-query sequence, it may use a distinct persistent dialogue session such that each training sub-query sequence may be generated in isolation from the other training sub-query sequences. In this way, a predetermined number of training sub-query sequences may be generated, any of which may include a series of training sub-queries alike or similar from those in other training sub-query sequences. Differences in training sub-queries between different sub-query sequences may be attributable to the generative AI model's probabilistic nature. The generative AI model considers various factors that may result in the selection of different words or sentence structures for the same input. Additionally, the generative AI model may be designed to produce diverse outputs, which leads to slight variations in answers even when the core input remains consistent. These differences reflect the generative AI model's attempt to provide nuanced and varied responses based on its training data.

In some implementations the number of training sub-queries within each sub-query sequence may be specified to be a predetermined number. For example, in some implementations each training sub-query sequence may have 3 training sub-queries. In other implementations, the number of training sub-queries may be not specified. In this way, the generative AI model may determine the number of training sub-queries during the generation of the training sub-query sequences, specific to the sub-queries themselves. In other words, some training sub-query sequences may be generated with a more gradual increase in complexity and a larger number of training sub-queries, while other training sub-query sequences may be generated with a more abrupt increase in complexity and a smaller number of training sub-queries.

In some implementations, decomposing the historical query into a training sub-query sequence may be based on non-greedy decoding. Examples of non-greedy decoding include top-k, top-p, beam search, or the like. Rather than immediately deciding where one training sub-query ends and another begins, non-greedy decoding considers larger sequences of the input historical query to ensure that a more optimal or globally accurate decomposition occurs. These methods avoid early, potentially suboptimal choices, and allow the process to account for factors like total efficiency, resource allocation, or the complexity of overlapping elements.

Continuing at block 410, the generative AI model may generate successive training responses according to the respective training sub-query sequences. This generation may occur within a predetermined number of newly created and distinct persistent dialogue sessions, such as to not contaminate the dialogue session that generated the training sub-queries with responses to the training sub-query sequence.

For example, having generated a training sub-query sequence having training sub-queries of "is investment tolerance mentioned in the client notes?", "what is the investment tolerance based on the client notes?", and "did we discuss any change in the client circumstances in relation to the investment tolerance?", in that order, a new persistent dialogue session may be created (i.e., opened), and each of these training sub-queries may provided to the generative AI model in sequential order within a persistent dialogue session.

In a different (i.e., distinct or "second") persistent dialogue session, a different training sub-query sequence may be provided, this training sub-query sequence having been generated from the same historical query but presenting differently as a result of the natural variation in output from the generative AI model. For example, this training sub-query sequence may be "is investment tolerance able to be changed?", "did the client mention wanting to change investment tolerance?", and "did the client mention any changes to their anticipated retirement date?", provided to the generative AI model in that order, having been generated based on the same historical query.

In some implementations, the generative AI model may output a response (i.e., a "training response") in each of the distinct persistent dialogue sessions after each training sub-query may be provided. In other implementations, the generative AI model may only output a training response in each of the distinct persistent dialogue sessions after all of the training sub-queries have been provided to the generative AI model, and the generative AI model may be prompted to output a response within each of the distinct persistent dialogue sessions.

Continuing at block 412, the system 130 may determine a singular integrated training response for each of the successive training responses.

It shall be appreciated that in implementations where the generative AI model outputs a training response after each training sub-query is provided, the system 130 may be left with multiple outputs, where each may include information unique to a particular output and not found in the other outputs within the training sub-query sequence. Additionally, or alternatively, the "final" or last training sub-query in the training sub-query sequence may elicit the generative AI model to output a training response most indicative of the ideal response to the training sub-query sequence.

As such, in some implementations, the final training sub-query may be taken as the singular "integrated" training response, such that this singular integrated training response may be carried forward in the next steps in the process, as will be described.

In other implementations, the singular integrated training response may be an aggregation of each of the training responses within a single training sub-query sequence. For example, if the training sub-query sequence consists of three training sub-queries, the generative AI model in these implementations may output a training response to each of the three training sub-queries, for a total of three training responses. These three training responses may be aggregated to form the integrated training response. To do so, in some implementations, the generative AI model may be prompted to aggregate the successive training responses into a single, integrated training response.

Continuing at block 414, the system 130 may then determine a preferred generated training response and a corresponding preferred training sub-query sequence. To do so, multiple singular integrated responses (i.e., multiple singular integrated responses each having been generated from a corresponding and unique training sub-query sequence, where multiple training sub-query sequences were generated as discussed previously) may each be compared to the historical response from the historical records repository. In this way, the particular training sub-query sequence (and the underlying sub-queries therein) that resulted in the singular integrated response most similar to the historical response may be considered to be the optimal method of generating a sub-query sequence and sub-queries.

To determine which singular integrated response may be most similar to the historical response, the system 130 may utilize similarity comparison measures such as cosine similarity, Jaccard similarity, Levenshtein distance, or the like. In cosine similarity, the system 130 converts the singular integrated response into vector representations based on their word frequency or embeddings, then calculates the cosine of the angle between these vectors and a vector of the historical response. The singular integrated response with the highest cosine value may be considered the most similar to the historical response. In Jaccard similarity, the system 130 compares the sets of words or characters in each singular integrated response, finding the ratio of the intersection to the union. The singular integrated response with the highest ratio may be deemed most similar. Alternatively, the system 130 can compute the Levenshtein distance, which quantifies how many single-character edits (insertions, deletions, or substitutions) are needed to change one singular integrated response into the historical response. The singular integrated response with the smallest Levenshtein distance to the historical response may be considered most similar.

Turning briefly to FIG. 6, FIG. 6 illustrates a flow diagram for query interface response synthesis via machine learning and progressive query data decomposition, in accordance with an implementation of the disclosure. As previously described, the historical query 602 may be received by the generative AI model resulting in two sub-query sequences— Breakdown A 604*a* and Breakdown B 604*b*. The generative AI model, in separate dialogue sessions, may generate corresponding responses 606*a* and 606*b*, which are integrated responses resulting from the generative AI model generating responses to the sub-queries within the Breakdown A 604*a* and Breakdown B 604*b*, respectively. As may be described with respect to block 414 of FIG. 4 above, responses 606*a* and 606*b* may then be compared to the historical response 608 to determine which response 606*a* or 606*b* most closely resembles the historical response 608.

Returning now to FIG. 4, at block 416, the system 130 may train the generative AI model to prioritize the preferred training sub-query sequence that output the preferred generated training response. This process may occur automatically or under human supervision. In some implementations, direct preference optimization is used, wherein the generative AI model directly optimizes its output to match specific preferences (e.g., a preferred generated training response) by relying on explicit preference data and/or rankings. For example, the generative AI model may use a dataset where preferences of generated training responses are defined and ordered. In other implementations, reinforcement learning may adjust parameters of the generative AI model to reward the preferred generated training response and negative reinforcement discourages undesirable generated training responses. Alternatively, a human operator may provide feedback manually, allowing for fine-tuned control over the model's adjustments. In any implementation, this iterative feedback loop enables the model to refine its internal parameters to favor actions or outputs that increase the likelihood of achieving the preferred outcome, thereby improving its predictive and generative capabilities over time.

Returning back to FIG. 3, having trained the generative AI model, at block 310 the system 130 may retrieve, using a retriever, data records corresponding with a user identifier. Indeed, the questionnaire, and the queries therein, may be directed to a specific user, such as a client of an entity, an employee of an entity, or any user that has ever had contact with the entity. To do so, a user identifier associated with the user may be input, for example at an interface (e.g., a dashboard) on an endpoint device 140, and thus provided to the system 130.

In other implementations, other means may be used to provide the user identifier to the system 130. For example, authentication credentials may be provided to an endpoint device 140. The endpoint device 140 may receive authentication credentials from a user, such as a username and password combination or other forms of token-based data. Upon receiving the credentials, the endpoint device 140 may transmit the credentials to an authentication server, which queries a database containing stored credential records. The database stores records in association with unique user identifiers. The authentication server may compare the received credentials with the stored credentials within the database to determine a match.

Upon determining that the credentials match an entry in the database, the server may retrieve the corresponding user identifier from the associated database record. This user identifier may take the form of a unique alphanumeric string or other unique token representing the user. The server may return the user identifier to the endpoint device 140, where it may be used for subsequent steps of the process.

Regardless of how the user identifier may be received, the user identifier may then be used to retrieve data records that correspond with the user identifier. The data records may take the form of any data involving the interaction of a person or their endpoint device 140. This may include, but is not limited to, voice audio data captured during phone calls or voice messages, transcriptions of spoken conversations, emails exchanged between the person and the entity, written letters or documents, instant messaging logs, text messages, social media interactions, video recordings of virtual meetings or conferences, biometric data such as fingerprint scans or facial recognition images, geolocation data from a mobile device 140, clickstream data from web browsing activities, and interaction logs with digital applications or platforms, such as app usage data, feedback forms, survey responses, purchase history, or the like.

The data records may include metadata or tags with the user identifier such that only the data records specific to the user identifier are retrieved.

At block 312, these data records associated with the user identifier may be transmitted to the generative AI model. At block 314 the generative AI model may generate, within a first persistent dialogue session, successive responses according to the sub-query sequence.

For example, data records containing a transcript of a phone call are associated with User X, and these may be provided to the generative AI model in a persistent dialogue session. Before, during, or after, the sub-query sequence, being made of sub-queries, may be provided to the same generative AI model. These sub queries, having been generated by the trained generative AI model trained in the manner according to FIG. 4, are tailored to elicit a generative response of high accuracy and quality. Moreover, the response may use, as context, the transcript of the phone call associated with the User X (or any number of data records associated with said user). In doing so, the generative AI model generates responses, in order of the sub-query sequence, to each of the sub-queries with appropriate context as to actual interactions between User X and the entity.

It shall be appreciated that in some implementations the generative AI model outputs a response after each sub-query may be provided. In other implementations, any output of the generative AI model may be withheld until the "final" or last sub-query in the sub-query sequence may be provided, which may elicit the generative AI model to output a response most indicative of the ideal response.

Turning briefly to FIG. 5, FIG. 5 illustrates a flow diagram for query interface response synthesis via machine learning and progressive query data decomposition, in accordance with an implementation of the disclosure. A sub-query 502 may be provided to the generator 510 (i.e., a generative AI model), while a retriever 504 returns data records from a data records repository 506 and provides the data records to the generator 510 as context 508. As a result of the generator 510 being executed with the sub-query 502 and the retrieved context 508, the response 512 may be output.

Returning to FIG. 3, at block 316, the system 130 may collate the successive responses into collated response data. In some implementations, collating the successive responses into the collated response data may first include determining a singular, integrated response from the successive responses. In implementations where the generative AI model outputs a response after each sub-query may be provided, the system 130 may be left with multiple outputs, where each may include information unique to a particular output and not found in the other outputs within the sub-query sequence. Additionally, or alternatively, the "final" or last sub-query in the sub-query sequence may elicit the generative AI model to output a response most indicative of the ideal response to the sub-query sequence. As such, in some implementations, the final sub-query may be taken as the singular "integrated" response, such that this singular integrated response may be carried forward in the next steps in the process, as will be described.

In other implementations, the singular integrated response may be an aggregation of each of the responses within a single sub-query sequence. For example, if the sub-query sequence consists of three sub-queries, the generative AI model in these implementations may output a response to each of the three sub-queries, for a total of three responses. These three responses may be aggregated to form the integrated response. To do so, in some implementations, the generative AI model may be prompted to aggregate the successive responses into a single, integrated response.

In some implementations, the collated response data may be structured as a data object having a key-value pair for each response of the successive responses. For example, the original query received from the retrievable text in the document may be stored as a key, while the corresponding singular integrated response may be stored as the value, creating a key value pair. In this way, the key-value pair facilitates the efficient storage and retrieval of questionnaire information, where the key serves as the lookup identifier based on the query and the value contains the data of the response.

In some implementations, the collated response data may further include a report having a predefined template for receiving the key-value pair for each response of the successive responses. The template may be a document such as a PDF, .docx, .xlsx, or the like for receiving the key-value pairs, and thereby provides a structured format for populating a document with queries and/or responses with designated placeholders. The template may include predefined fields, each corresponding to a unique key, which are embedded within a layout. These keys serve as identifiers for responses. When a key-value pair may be received, the key may locate the corresponding field in the template, and the response may be populated into that field. The template allows for generating documents customized to a user identifier while the static layout remains unchanged and response data varies based on the key-value pairs provided. In this way, given a predefined template, separate questionnaires, each related to a user identifier of an entity, can be completed, where the responses to the queries within a questionnaire are specifically tailored to each user identifier based on interactions with the entity.

As will be appreciated by one of ordinary skill in the art, the present disclosure may be implemented as an apparatus (including, for example, a system, a machine, a device, a computer program product, and/or the like), as a method (including, for example, an enterprise process, a computer-implemented process, and/or the like), as a computer program product (including firmware, resident software, microcode, and the like), or as any combination of the foregoing. Many modifications and other implementations of the present disclosure set forth herein will come to mind to one skilled in the art to which these implementations pertain having the benefit of the teachings presented in the foregoing descriptions and the associated drawings. Although the Figures only show certain components of the methods and systems described herein, it is understood that various other components may also be part of the disclosures herein. In addition, the method described above may include fewer steps in some cases, while in other cases may include additional steps. Modifications to the steps of the method described above, in some cases, may be performed in any order and in any combination.

Therefore, it is to be understood that the present disclosure is not to be limited to the specific implementations disclosed and that modifications and other implementations are intended to be included within the scope of the appended claims. Although specific terms are employed herein, they are used in a generic and descriptive sense only and not for purposes of limitation.

What is claimed is:

1. A system for query interface response synthesis via machine learning and progressive query data decomposition, the system comprising:
   a computing processor; and
   a non-transitory storage device containing instructions, when executed by the computing processor, the instructions cause the computing processor to perform the steps of:
   receiving a document;
   parsing retrievable text in the document to identify a query in the retrievable text;
   decomposing the query, using a generative AI model comprising a large language model, into a sub-query sequence, wherein the sub-query sequence comprises a plurality of sub-queries, the plurality of sub-queries within the sub-query sequence successively increasing in complexity;
   retrieving, using a retriever, data records corresponding with a user identifier;
   transmitting the data records to the generative AI model;
   generating, within a first persistent dialogue session of the generative AI model, successive responses according to the sub-query sequence;
   collating the successive responses into collated response data;
   receiving, from a historical records repository, a historical query and a historical response corresponding to the historical query;
   applying a ground truth label to the historical response;
   transmitting the historical query to the generative AI model;
   decomposing, by using the generative AI model, the historical query into a training sub-query sequence in each of a first set of a predetermined number of distinct persistent dialogue sessions, wherein each training sub-query sequence comprises a respective plurality of training sub-queries successively increasing in complexity;
   generating, by a second set of a predetermined number of distinct persistent dialogue sessions, wherein each of the second set of a predetermined number of distinct persistent dialogue sessions is provided with a corresponding training sub-query sequence, successive training responses according to the respective training sub-query sequence;

determining a singular integrated training response for each of the successive training responses, each singular integrated training response being selected from the group consisting of:
(i) a final training response of the respective successive training response, and
(ii) an aggregated training response comprising the respective successive training response aggregated by the generative AI model;
determining a preferred generated training response and a corresponding preferred training sub-query sequence, the preferred generated training response being the singular integrated training response most similar to the historical response; and
training the generative AI model to prioritize the preferred training sub-query sequence that output the preferred generated training response.

2. The system of claim 1, wherein the document comprises inaccessible text embedded in the document, and wherein the instructions further cause the processing device to perform the steps of:
processing the document, using optical character recognition, to transform the inaccessible text into the retrievable text.

3. The system of claim 1, wherein decomposing the historical query into a training sub-query sequence in each of the first set of the predetermined number of distinct persistent dialogue sessions is based on non-greedy decoding of at least one selected from the group consisting of: top-k, top-p, and beam search.

4. The system of claim 1, wherein the collated response data comprises a data object comprising a key-value pair for each response of the successive responses.

5. The system of claim 4, wherein the collated response data further comprises a report comprising a predefined template for receiving the key-value pair for each response of the successive responses.

6. The system of claim 1, wherein collating the successive responses into the collated response data comprises:
determining a singular integrated response from the successive responses, the singular integrated response being selected from the group consisting of: (i) a final response of the successive responses, and (ii) an aggregated response comprising the successive responses aggregated by the generative AI model.

7. A computer program product for query interface response synthesis via machine learning and progressive query data decomposition, the computer program product comprising a non-transitory computer-readable medium comprising code causing an apparatus to:
receive a document;
parse retrievable text in the document to identify a query in the retrievable text;
decompose the query, using a generative AI model comprising a large language model, into a sub-query sequence, wherein the sub-query sequence comprises a plurality of sub-queries, the plurality of sub-queries within the sub-query sequence successively increasing in complexity;
retrieve, using a retriever, data records corresponding with a user identifier;
transmit the data records to the generative AI model;
generate, within a first persistent dialogue session of the generative AI model, successive responses according to the sub-query sequence;
collate the successive responses into collated response data;
receive, from a historical records repository, a historical query and a historical response corresponding to the historical query;
apply a ground truth label to the historical response; transmit the historical query to the generative AI model;
decompose, by using the generative AI model, the historical query into a training sub-query sequence in each of a first set of a predetermined number of distinct persistent dialogue sessions, wherein each training sub-query sequence comprises a respective plurality of training sub-queries successively increasing in complexity;
generate, by a second set of a predetermined number of distinct persistent dialogue sessions, wherein each of the second set of a predetermined number of distinct persistent dialogue sessions is provided with a corresponding training sub-query sequence, successive training responses according to the respective training sub-query sequence;
determine a singular integrated training response for each of the successive training responses, each singular integrated training response being selected from the group consisting of:
(i) a final training response of the respective successive training response, and
(ii) an aggregated training response comprising the respective successive training response aggregated by the generative AI model;
determine a preferred generated training response and a corresponding preferred training sub-query sequence, the preferred generated training response being the singular integrated training response most similar to the historical response; and
train the generative AI model to prioritize the preferred training sub-query sequence that output the preferred generated training response.

8. The computer program product of claim 7, wherein the document comprises inaccessible text embedded in the document, and wherein the code further causes the apparatus to:
process the document, using optical character recognition, to transform the inaccessible text into the retrievable text.

9. The computer program product of claim 7, wherein decomposing the historical query into a training sub-query sequence in each of the first set of the predetermined number of distinct persistent dialogue sessions is based on non-greedy decoding of at least one selected from the group consisting of: top-k, top-p, and beam search.

10. The computer program product of claim 7, wherein the collated response data comprises a data object comprising a key-value pair for each response of the successive responses.

11. The computer program product of claim 10, wherein the collated response data further comprises a report comprising a predefined template for receiving the key-value pair for each response of the successive responses.

12. The computer program product of claim 7, wherein collating the successive responses into the collated response data comprises:
determining a singular integrated response from the successive responses, the singular integrated response being selected from the group consisting of: (i) a final response of the successive responses, and (ii) an aggregated response comprising the successive responses aggregated by the generative AI model.

13. A method for query interface response synthesis via machine learning and progressive query data decomposition, the method comprising:
- receiving a document; parsing retrievable text in the document to identify a query in the retrievable text;
- decomposing the query, using a generative AI model comprising a large language model, into a sub-query sequence, wherein the sub-query sequence comprises a plurality of sub-queries, the plurality of sub-queries within the sub-query sequence successively increasing in complexity;
- retrieving, using a retriever, data records corresponding with a user identifier; transmitting the data records to the generative AI model;
- generating, within a first persistent dialogue session of the generative AI model, successive responses according to the sub-query sequence; and
- collating the successive responses into collated response data-;
- receiving, from a historical records repository, a historical query and a historical response corresponding to the historical query;
- applying a ground truth label to the historical response;
- transmitting the historical query to the generative AI model;
- decomposing, by using the generative AI model, the historical query into a training sub-query sequence in each of a first set of a predetermined number of distinct persistent dialogue sessions, wherein each training sub-query sequence comprises a respective plurality of training sub-queries successively increasing in complexity:
- generating, by a second set of a predetermined number of distinct persistent dialogue sessions, wherein each of the second set of a predetermined number of distinct persistent dialogue sessions is provided with a corresponding training sub-query sequence, successive training responses according to the respective training sub-query sequence;
- determining a singular integrated training response for each of the successive training responses, each singular integrated training response being selected from the group consisting of:
  (i) a final training response of the respective successive training response, and
  (ii) an aggregated training response comprising the respective successive training response aggregated by the generative AI model;
- determining a preferred generated training response and a corresponding preferred training sub-query sequence, the preferred generated training response being the singular integrated training response most similar to the historical response; and
- training the generative AI model to prioritize the preferred training sub-query sequence that output the preferred generated training response.

14. The method of claim 13, wherein the document comprises inaccessible text embedded in the document, and wherein the method further comprises:
- processing the document, using optical character recognition, to transform the inaccessible text into the retrievable text.

15. The method of claim 13, wherein decomposing the historical query into a training sub-query sequence in each of the first set of the predetermined number of distinct persistent dialogue sessions is based on non-greedy decoding of at least one selected from the group consisting of: top-k, top-p, and beam search.

16. The method of claim 13, wherein the collated response data comprises a data object comprising a key-value pair for each response of the successive responses.

17. The method of claim 13, wherein collating the successive responses into the collated response data comprises:
- determining a singular integrated response from the successive responses, the singular integrated response being selected from the group consisting of: (i) a final response of the successive responses, and (ii) an aggregated response comprising the successive responses aggregated by the generative AI model.

* * * * *